United States Patent [19]
Bonfanti et al.

[11] Patent Number: 5,432,248
[45] Date of Patent: Jul. 11, 1995

[54] THERMOTROPIC POLYESTERIMIDE, A PROCESS FOR ITS PREPARATION, AND ITS USE

[75] Inventors: Cesarina Bonfanti; Alessandro Lezzi; Ugo Pedretti, all of Milan; Arnaldo Roggero, San Donato Milanese; Francesco P. La Mantia, Palermo, all of Italy

[73] Assignee: Eniricerche S.p.A., Milan, Italy

[21] Appl. No.: 44,214

[22] Filed: Apr. 7, 1993

[30] Foreign Application Priority Data

Apr. 10, 1992 [IT] Italy ............... MI92A0870

[51] Int. Cl.⁶ ............................. C08G 73/16
[52] U.S. Cl. ........................ 528/170; 528/183; 528/184; 528/188; 528/271; 528/289; 528/310; 528/322
[58] Field of Search ............... 528/170, 322, 271, 183, 528/184, 188, 310, 289

[56] References Cited

U.S. PATENT DOCUMENTS

| | | | |
|---|---|---|---|
| 4,176,223 | 11/1979 | Irwin | 528/170 |
| 4,383,105 | 5/1983 | Irwin | 528/170 |
| 4,727,129 | 2/1988 | Hisgen et al. | 528/171 |
| 4,728,713 | 3/1988 | Hisgen et al. | 528/183 |
| 4,728,714 | 3/1988 | Hisgen et al. | 528/183 |
| 4,760,124 | 7/1988 | Matsumura et al. | 528/170 |
| 4,861,857 | 8/1989 | Kricheldorf et al. | 528/170 |
| 4,923,953 | 5/1990 | Neugebauer et al. | 528/170 |
| 4,948,863 | 8/1990 | Dicke et al. | 528/170 |
| 4,954,606 | 9/1990 | Dicke et al. | 528/170 |
| 5,109,100 | 4/1992 | Fujiwara et al. | 528/170 |
| 5,120,820 | 6/1992 | Fujiwara et al. | 528/170 |
| 5,243,017 | 9/1993 | Pedretti et al. | 528/271 |

FOREIGN PATENT DOCUMENTS 0225529 6/1987 European Pat. Off. .
0225537 6/1987 European Pat. Off. .
0341397 11/1989 European Pat. Off. .
0375960 7/1990 European Pat. Off. .

OTHER PUBLICATIONS

H. R. Kricheldorf et al., Macromolecules 24, No. 5, pp. 1011–1016 (Mar. 4, 1991).

*Primary Examiner*—Paul R. Michl
*Assistant Examiner*—P. Hampton-Hightower
*Attorney, Agent, or Firm*—Rogers & Wells

[57] ABSTRACT

A thermotropic polyesterimide, in which the liquid-crystalline phase is of nematic structure within a useful temperature range, consists of units of formula:

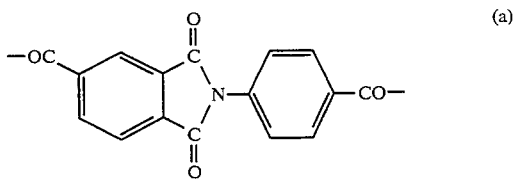

(a)

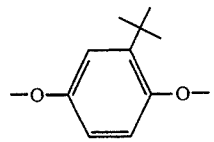

(b)

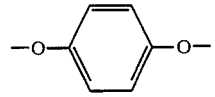

(c)

the units being in the following ratios:

$a/(b+c)=1$ $c/b = 0-50/50$, and preferably $c/b < 30/70$

The polyesterimide of the present invention possesses self-reinforcement characteristics, or reinforcement characteristics for traditional thermoplastic materials.

13 Claims, No Drawings

THERMOTROPIC POLYESTERIMIDE, A PROCESS FOR ITS PREPARATION, AND ITS USE

BACKGROUND OF THE INVENTION

This invention relates to a completely aromatic thermotropic polyesterimide, the process for its preparation and its use as a self-reinforced material or as a reinforcing material for traditional thermoplastic polymers.

Thermotropic polyesterimides of high melting point deriving from the reaction of 4-carboxy-N-(p-carboxyphenyl)phthalimide with hydroquinones substituted with methyl, chlorine, bromine, phenyl or thiophenyl are described in Macromolecules, Kricheldorf H. R. et al., 24, 1011–1015 (1991).

Thermotropic polyesterimides with a melting point exceeding 300° C., deriving from the reaction of 4-carboxy-N-(p-carboxyphenyl) phthalimide with substituted hydroquinones and with 2,6-naphthalenedicarboxylic acid are described in U.S. Pat. No. 4,176,223, while U.S. Pat. No. 4,383,105 describes thermotropic polyesterimides deriving from the reaction of 4-carboxy-N-(p-carboxyphenyl) phthalimide with hydroquinones, including substituted hydroquinones, and with 6-hydroxy-2-naphthoic acid. The polyesterimides of this latter patent also melt at a temperature exceeding 300° C. These materials are usable as self-reinforced materials or as reinforcing materials for traditional thermoplastic polymers.

SUMMARY OF THE INVENTION

We have now discovered completely aromatic polyesterimides having thermotropic characteristics within a useful mesophase temperature range, usable as self-reinforced or reinforcing materials, which compared with the known art have better characteristics in terms both of a lower working temperature and of their elastic modulus. In accordance therewith, a first aspect of the present invention is a thermotropic polyesterimide, in which the liquid-crystalline phase is of nematic structure within a useful temperature range, consisting of units of formula:

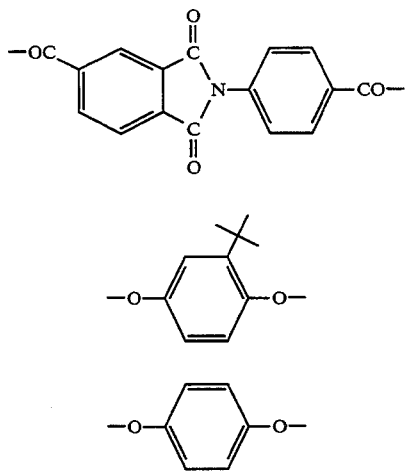

with the following unit ratios:

$a/(b+c) = 1$ $c/b = 0 - 50/50$, and preferably $c/b\ 30/70$.

This polyesterimide can be prepared by polymerizing in the molten state a mixture containing 4-carboxy-N-(p-carboxyphenyl) phthalimide (I), a diacyloxy derivative of t-butyl-hydroquinone (II) and a diacyloxy derivative of hydroquinone (III), in the following molar ratios:

$I/(II+III) = 1$ $III/II = 0 - 50/50$, and preferably $III/II < 30/70$.

The t-butyl-hydroquinone and hydroquinone diacetoxy derivatives used are the diacetoxy derivatives, obtainable by reacting t-butyl-hydroquinone and hydroquinone with acetic anhydride. The 4-carboxy-N-(p-carboxyphenyl)phthalimide used as comonomer can be conveniently prepared by condensing trimellitic anhydride with p-aminobenzoic acid.

DESCRIPTION OF THE PREFERRED EMBODIMENTS

The polymerization is conducted in the presence of a metal oxide catalyst, preferably magnesium oxide. The catalyst quantity conveniently used is between 0.01 and 1 part by weight per 100 parts by weight of the monomers subjected to polymerization. The polymerization reaction is conducted by varying the temperature from about 220° C. to a final temperature of 330° C., preferably 310° C. Under these reaction conditions a smaller quantity of tert-butyl substituent is lost.

Carboxylic acid is evolved during the polymerization. Specifically, acetic acid is evolved if hydroquinone and t-butyl-hydroquinone diacetoxy derivatives are used as monomers. The carboxylic acid is removed from the reaction mixture to increase the degree of polymerization to the desired level. For this purpose it is convenient to operate at reduced pressure at least during the final part of the polymerization. The time required for polymerization generally varies from 3 to 20 hours, and preferably from 5 to 7 hours.

According to a preferred embodiment, the 4-carboxy-N-(p-carboxy-phenyl)phthalimide, the t-butyl-hydroquinone, possibly the hydroquinone, the catalyst and acetic anhydride are fed into the reactor in a molar quantity double that of the hydroquinones present.

The mixture is heated to a temperature of the order of 140° C. for about 4 hours to form the diacetoxy derivatives of the hydroquinones present. Polymerization is then effected under the aforesaid conditions. On termination of the reaction the polyesterimide is subjected to purification by prolonged extraction with boiling organic solvents or by precipitation from solutions in organic solvents.

The polyesterimide of the present invention has an inherent viscosity of between 0.7 and 2 dl/g when measured at 20° C. at 0.5 g/dl concentration in a 4/1 v/v mixture of methylene chloride and trifluoroacetic acid.

The polyesterimide characteristics are determined on powdered samples by X-ray diffraction using a Philips vertical goniometer with electronic pulse counting and using Cu K α radiation. The X-ray diffraction spectrum at ambient temperature shows no evidence of crystallinity.

The thermotropic polyesterimide of the present invention has a glass transition temperature (Tg) of between 180° and 220° C., determined by differential scanning calorimetry (DSC) using a Perkin Elmer DSC7 instrument at a rate of 20° C./min.

When the polyesterimide is heated beyond the glass transition temperature a liquid-crystalline phase of nematic type appears, as determined by polarized light optical microscope with a heating table.

The thermotropic polyesterimide of the present invention can be transformed using usual working methods such as injection moulding and extrusion. Using extrusion, preferential orientations can be induced in the flow direction, these being intensified by stretching. In terms of mechanical characteristics, the polyesterimide when extruded and drafted has an extension modulus of 50-75 GPa and an ultimate tensile stress of 500-800 MPa. The polyesterimides of the prior art described in U.S. Pat. No. 4,176,223 and U.S. Pat. No. 4,383,105 have an extension modulus of 29-58 GPa and an ultimate tensile stress of 350-1000 MPa.

The polyesterimide of the present invention can be used as a reinforcing agent for traditional thermoplastic materials such as polycarbonate, polybuteneterephthalate and nylon. In this case it is used in a concentration of 5-30 parts by weight of polyesterimide per 100 parts by weight of thermoplastic polymer, and improves the mechanical characteristics of the thermoplastic material. The polyesterimide also produces a significant reduction in the mixture viscosity, allowing spinning at a temperature lower than that usually required for transforming the matrix, so enabling hot drafting to be better utilized.

The following experimental examples are provided to better illustrate the invention.

EXAMPLE 1

Preparation of 4-carboxy-N-(p-carboxyphenyl)phthalimide monomer 38.42 g of trimellitic anhydride (0.2 moles), 27.4 g of p-amino-benzoic acid (0.2 moles) and 300 cc of N,N'-dimethylformamide are fed into a glass flask of 500 cc volume fitted with a mechanical stirrer, a thermometer and a vertical condenser. The reaction mixture is heated to 140° C. and left under stirring for three hours. On termination of this reaction time, the mixture is cooled to ambient temperature and poured into 2 liters of water under stirring. The precipitate is filtered off and washed repeatedly with methanol. After drying the product at 100° C. in a vacuum oven, 46.5 g of the product of the title are obtained. Yield 75%. The product structure is confirmed by NMR spectroscopy on a sample dissolved in deuterated dimethylsulphoxide.

EXAMPLE 2

The following reactants are fed into a 1 liter reactor fitted with a stirrer connected via a Brignole seal, a nitrogen feed pipe and a condenser:

4-carboxy-N-(p-carboxyphenyl)phthalimide 28.1 g (0.09 moles)
t-butylhydroquinone 15 g (0.09 moles)
acetic anhydride 50 cc
magnesium oxide 17 mg.

The reactant mixture is heated to 140° C. with an oil bath and is maintained at this temperature under stirring for 2 hours. Under these conditions complete acetylation of the hydroxyl groups takes place.

The reaction temperature is then gradually raised to 310° C. over a time of 5 hours under a slight nitrogen flow, after replacing the oil bath with a molten salt bath.

The excess acetic anhydride and the acetic acid formed during the acetylation reaction and polycondensation are distilled off and condensed in a test-tube maintained at $-78°$ C. with solid carbon dioxide. During this period, when the temperature reaches 240°-260° C. the reaction mass becomes opalescent and the viscosity begins to increase as the temperature increases.

The nitrogen flow is then halted and the molten mass is reduced in pressure to a final value of $10^{-2}$ mm Hg.

The reaction proceeds under these conditions for 1 hour. The mass is then cooled under vacuum to ambient temperature.

The polyesterimide obtained in this manner has an inherent viscosity of about 1 dl/g when measured at 25° C., at a 0.5 g/dl concentration in a 4/1 v/v mixture of methylene chloride and trifluoroacetic acid.

EXAMPLE 3

The polyesterimide obtained by the procedure of Example 2 is subjected to spinning and drawing using a Rheoscope 1000 Ceast viscometer fitted with a tensile module and a conic nozzle with a 30° half angle, a diameter of 0.3 mm and an L/D ratio of 20. The operating temperature is 280° C., with a draft ratio of between 300 and 500.

The fibres obtained in this manner have an extension modulus of between 50 and 75 GPa, an ultimate tensile stress of between 500 and 800 MPa and an ultimate elongation of between 2 and 1%. The mechanical properties are evaluated with an Instron Mod. 6025 instrument with an elongation rate of 0.5 $min^{-1}$.

EXAMPLE 4

The polyesterimide obtained in Example 2 and polycarbonate are mixed in the molten state in a weight ratio of 20:80 in a Brabender mixer at a temperature of 280° C. The mixture obtained in this manner is finely ground in the presence of dry ice, and after drying for 4 hours at 140° C. in a ventilated oven is compression-moulded at 280° C. for 5 minutes at a pressure of 10 MPa.

The product obtained has an extension modulus of 1.8-2.0 GPa and an ultimate tensile stress of 50-60 MPa, with an ultimate elongation of 60-50%.

EXAMPLE 5

The polyesterimide obtained in Example 2 is mixed with polycarbonate as in the preceding example. The mixture obtained is spun as in Example 3 with a draft ratio of 400.

The fibres obtained have an extension modulus of between 8 and 10 GPa, an ultimate tensile stress of between 150 and 200 MPa and an ultimate elongation of between 5 and 3%.

What is claimed is:

1. A thermotropic polyesterimide consisting of units of formula (a) and (b), with or without units of formula (c):

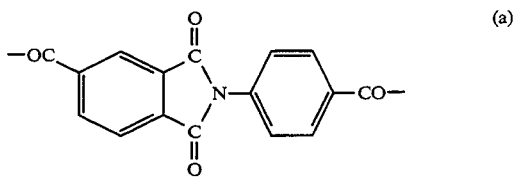

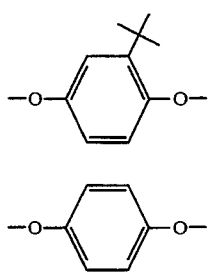

(b)

(c)

wherein the units are in the following ratios:

$a/(b+c)=1$ $c/b = 0-50/50$

2. A polyesterimide as claimed in claim 1, wherein the units are in the following ratios:

$a/(b+c)=1$ $c/b <30/70.$

3. A polyesterimide as claimed in claim 1, having an inherent viscosity of between 0.7 and 2 dl/g when measured at 20° C. at 0.5 g/dl concentration in a 4/1 v/v mixture of methylene chloride and trifluoroacetic acid.

4. A process for preparing the polyesterimide of claim 1, which consists of polymerizing, in the molten state, a monomer mixture containing 4-carboxy-N-(p-carboxyphenyl)phthalimide, a monomer prepared by reacting t-butyl-hydroquinone and acetic anhydride, and a monomer prepared by reacting hydroquinone and acetic anhydride in the presence of a metal oxide catalyst by heating the monomer mixture to about 220° C. and progressively raising the temperature to about 330° C., the molar ratio of the 4-carboxy-N-(p-carboxyphenyl) phthalimide to the total molar ratio of the monomers prepared by reacting t-butyl hydroquinone with acetic anhydride and hydroquinone with acetic anhydride equals one and wherein the molar ratio of the monomer prepared by reacting hydroquinone and acetic anhydride to the monomer prepared by reacting t-butyl hydroquinone and acetic anhydride is between 0 and 50/50 and wherein the catalyst amount is between 0.01 and 1 part by weight per 100 parts by weight of the monomers.

5. A process as claimed in claim 4, wherein the diacyloxy derivatives of t-butyl-hydroqinone and hydroquinone are acetoxy derivatives.

6. A process as claimed in claim 5, wherein the acefoxy derivatives of t-butyl-hydroquinone and hydroquinone are prepared in situ in the presence of 4-carboxy-N-(p-carboxyphenyl) phthalimide by reacting said hydroquinones with acetic anhydride in a 0.5 molar ratio.

7. A fiber or molded object of the polyesterimide as claimed in claim 1.

8. A thermoplastic material selected from the group consisting of polycarbonate, polybuthyleneterephthalate, and nylon, which thermoplastic material is reinforced with 5-30 parts of the polyesterimide of claim 1 per 100 parts of the thermoplastic material.

9. A process as claimed in claim 4, wherein the molar ratio of the monomer prepared by reacting hydroquinone and acetic anhydride to the monomer prepared by reacting t-butyl hydroquinone and acetic anhydride is less than 30/70.

10. A process as claimed in claim 4, wherein the temperature to which the monomer mixture is progressively raised during the polymerization is 310° C.

11. A process as claimed in claim 4, wherein the catalyst is magnesium oxide.

12. A process as claimed in claim 4, wherein the molar ratio of the monomer prepared by reacting hydroquinone and acetic anhydride to the monomer prepared by reacting t-butyl hydroquinone and acetic anhydride is less than 30/70; wherein the temperature to which the monomer mixture is progressively raised during the polymerization is 310° C.; and wherein the catalyst is magnesium oxide.

13. A process for reinforcing a thermoplastic polymer selected from the group consisting of polycarbonate, polybutylene terephthalate, and nylon, which comprises adding the polyesterimide of claim 1 to the polymer.

* * * * *